US008667576B2

(12) United States Patent
Lin et al.

(10) Patent No.: US 8,667,576 B2
(45) Date of Patent: Mar. 4, 2014

(54) METHOD FOR PREVENTING DATA IN A COMPUTER SYSTEM FROM BEING ACCESSED BY UNAUTHORIZED USER

(75) Inventors: Yi-Shen Lin, Hsinchu (TW); Chang-Hao Chiang, Hsinchu (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 1064 days.

(21) Appl. No.: 12/127,061

(22) Filed: May 27, 2008

(65) Prior Publication Data

US 2009/0300753 A1    Dec. 3, 2009

(51) Int. Cl.
   *G06F 12/14*    (2006.01)

(52) U.S. Cl.
   USPC ............ 726/16; 726/2; 726/4; 726/9; 726/17; 726/20; 726/21; 713/155; 713/161; 713/168; 713/182; 713/183; 713/185; 380/30; 705/18; 705/50

(58) Field of Classification Search
   USPC .............. 726/2, 4, 9, 16, 17, 20, 21; 709/219, 709/231; 710/13; 707/793, 797, 805, 823, 707/824; 705/18, 50; 713/183, 155, 161, 713/168, 182, 185; 380/30
   See application file for complete search history.

(56) References Cited

U.S. PATENT DOCUMENTS

| | | | |
|---|---|---|---|
| 5,774,652 A * | 6/1998 | Smith | 726/20 |
| 7,174,433 B2 * | 2/2007 | Kottomtharayil et al. | 711/147 |
| 7,185,204 B2 * | 2/2007 | Narayanaswami et al. | 713/182 |
| 7,434,251 B2 * | 10/2008 | Ooi et al. | 726/9 |
| 7,970,805 B2 * | 6/2011 | Deng | 707/823 |
| 2005/0081064 A1 | 4/2005 | Ooi et al. | |
| 2008/0040358 A1 | 2/2008 | Deng | |
| 2008/0165382 A1 * | 7/2008 | Ferlitsch | 358/1.15 |

FOREIGN PATENT DOCUMENTS

| | | |
|---|---|---|
| CN | 101051292 | 10/2007 |
| TW | 200801918 | 1/2008 |
| TW | 200813776 | 3/2008 |

OTHER PUBLICATIONS

Chinese language office action dated May 18, 2010.
English language translation of abstract of CN 101051292 (published Oct. 10, 2007).
Taiwanese language office action dated Mar. 3, 2012.
English language translation of abstract of TW 200801918 (published Jan. 1, 2008).
English language translation of abstract of TW 200813776 (published Mar. 16, 2008).
Chinese language office action dated Jun. 29, 2012.

* cited by examiner

*Primary Examiner* — Thanhnga B Truong
(74) *Attorney, Agent, or Firm* — McClure, Qualey & Rodack, LLP

(57) ABSTRACT

A computer system is provided comprising a non-volatile storage medium and a processor. The processor acquires authentication information from a first removable storage device, stores the authentication information into the non-volatile storage medium, and forbids data access of the computer system when detecting that a second removable storage device has been inserted and identification data of the second removable storage device is different from the authentication information.

19 Claims, 5 Drawing Sheets

METHOD FOR PREVENTING DATA IN A COMPUTER SYSTEM FROM BEING ACCESSED BY UNAUTHORIZED USER

BACKGROUND OF THE INVENTION

1. Field of the Invention

The invention relates to a system and method for data protection, and more particularly to a system and method for preventing data in a computer system from being accessed by an unauthorized user.

2. Description of the Related Art

Recently, there has been an explosive increase in the use of small, removable storage devices or storage devices for transporting data from one computer to another, e.g., an employee can save their work files quickly on the removable storage device, take the drive home, and then plug the removable storage device into their home or laptop computer to access their work.

Universal Serial Bus (USB) devices are typically used as removable storage devices with their use simply requiring a user to plug or insert the USB device into the USB port of a computer system and within seconds a new drive or removable disk appears on the desktop. The USB drives have become so popular in part because they do not need batteries, provide solid state data storage with long data retention, offer good data transfer speeds, and are durable and portable.

The USB drives may also serve as a key device that allows a computer system to automatically lock itself to prevent data in a computer system from being accessed by an unauthorized user. In this case, the computer system is automatically locked when the key device has been removed from the computer system and is released or unlocked when the key device is once again plugged or inserted. In this implementation, however, after the key device has been removed, the keyboard and mouse of the computer system will also be locked so that it is impossible to operate the computer system for presentation or demonstration.

BRIEF SUMMARY OF THE INVENTION

A computer system is provided. The computer system comprises a non-volatile storage medium and a processor. The processor acquires authentication information from a first removable storage device, stores the authentication information into the non-volatile storage medium, and forbids data access of the computer system when detecting that a second removable storage device has been inserted and identification data of the second removable storage device is different from the authentication information.

A method for data protection in a computer system is provided. First, authentication information is acquired from a first removable storage device. Next, data access of the computer system is forbidden when detecting that a second removable storage device has been inserted and identification data of the second removable storage device is different from the authentication information.

A machine-readable storage medium storing a computer program performing a method for data protection is provided. First, authentication information is acquired from a first removable storage device. Next, data access of the computer system is allowed when detecting that a second removable storage device has been inserted and identification data of the second removable storage device is the same as the authentication information and data access of the computer system is forbidden when identification data of the second removable storage device is different from the authentication information.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
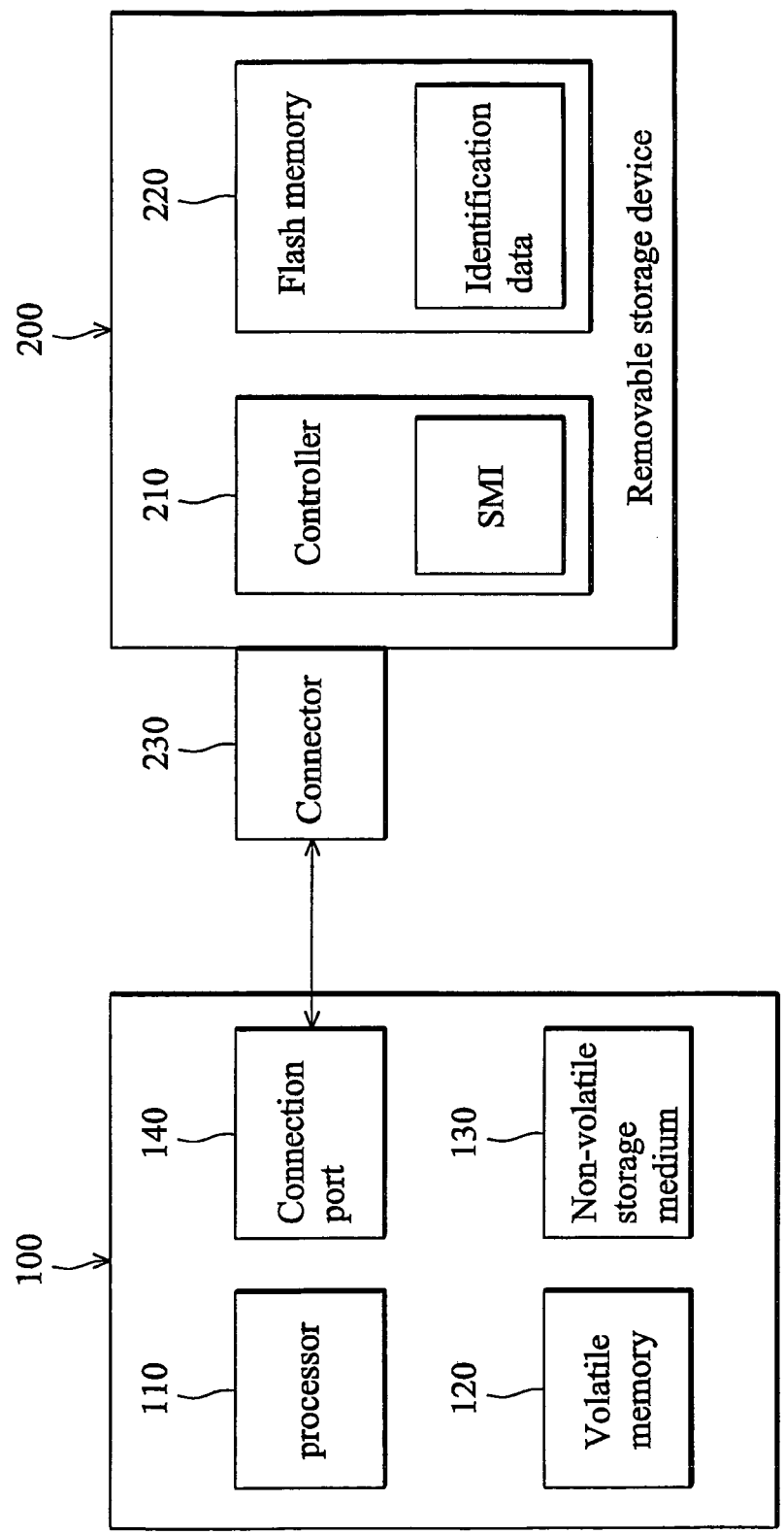
FIG. 1 shows an embodiment of a system for data protection.

FIG. 1 shows an embodiment of a system for data protection. As shown in FIG. 1, the computer system 100 at least comprises a processor 110, a volatile memory 120, a non-volatile storage medium 130 and a connection port 140 (e.g. USB port). The removable storage device 200 comprises a controller 210, a flash memory 220 and a connector 230. The computer system 100 may include any devices with an operating system (OS) that supports the port and communication protocol of the removable device (e.g., an OS that supports USB such as with a USB driver or the like).

The volatile memory 120, such as a dynamic random access memory (DRAM), static random access memory (SRAM), or others, may store the computer program and be accessed by the processor 110. The non-volatile storage medium 130 (e.g. hard disk or flash memory) stores data of the computer system 100 and stores a specific application, protection application P, to acquire information from the plugged or inserted removable storage device 200. The protection application P is detailed in the following. The connection port 140 provides an interface, e.g., a pluggable communication interface, for receiving the removable storage device 200. For example, the removable storage device 200 is capable of plugging into the connection port 140 of the computer system 100 through the connector 230. The processor 110 can execute a computer program performing a method for data protection to prevent data in the computer system 100 from being accessed by an unauthorized user. The computer system may comprise an input unit such as a keyboard and mouse (not shown) to operate it.

The controller 210 may have an identification data such as a predefined text string "SMI" such that the type of the removable storage device may be obtained and recognized. The flash memory 220 may store identification data of the removable storage device 200. The identification (ID) data of the removable storage device 200 may comprise, for example, a product identification number, a vendor identification number or a serial number thereof, or combinations of the like. It is noted that each removable storage device has a unique serial number, although the product identification number or the vendor identification number thereof may be the same. The identification data of a removable storage device is different from each other and thus it may serve as a key for identifying itself. The removable storage device 200 may be, for example, any device that has memory and can be inserted into a connection port of computer system, computing system, or electronic device with one preferred embodiment having a port such as a USB port (e.g. USB key, USB flash drive, USB memory stick or the like).

Figure 2:
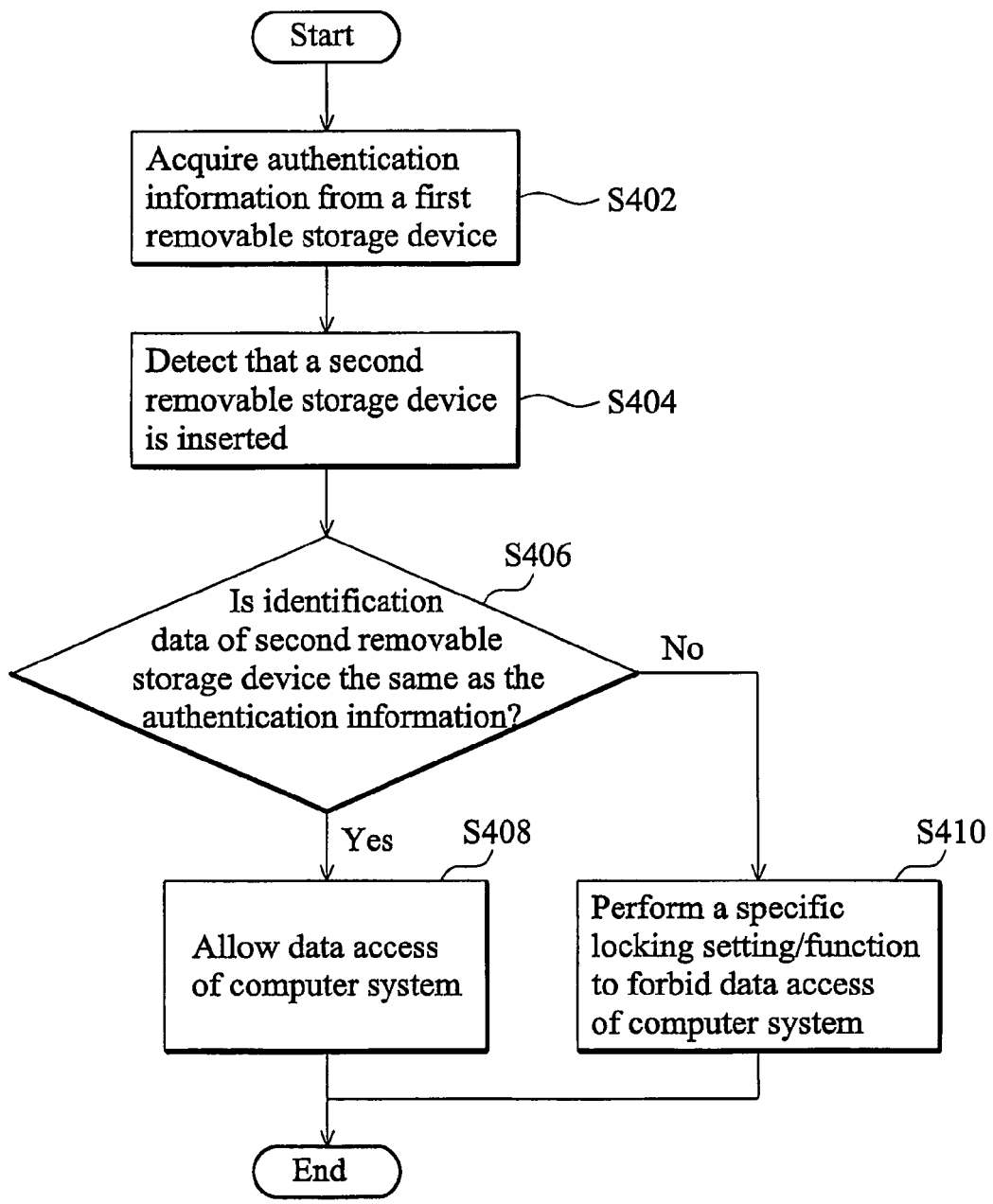
FIG. 2 is a flowchart of a method for data protection applied in a computer system.

FIG. 2 is a flowchart of a method for data protection applied in a computer system, and the method can be stored in a computer program and executed by the processor as described in FIG. 1. Note that, initially, the computer system is defined as being operated in a normal state. Referring to FIGS. 1 and 2, in step S402, authentication information is acquired from a first removable storage device 200. The authentication information may be the identification data prestored in the flash memory 220 of the first removable storage device 200 so that it can be acquired from the flash memory 220. In step S404, it is detected that a second removable storage device has been inserted. In step S406, it is determined whether identification data of the second removable storage device is the same as the authentication information. When the identification data of the second removable storage device is the same as the authentication information (Yes in Step S406), i.e. the inserted removable storage device is the original first removable storage device, in step S408, it is allowed to access data of the computer system such as copy data in/out the first removable storage device. Otherwise, when the identification data of the second removable storage device is different from the authentication information and the first removable storage device had been removed (No in Step S406), in step S410, it indicates that there is an unauthorized access so that a specific locking setting/function is performed to forbid data access of the computer system 100. The specific lock setting/function may comprise a setting or operation for locking the keyboard and mouse, activating the screen saver, locking the computer system, forcing the user to log out, locking the copy and paste function, disconnecting from the network, disabling the function of recorder and so on. In some embodiments, a specific operation for copying data from the second removable storage device will be performed if an unauthorized access occurs. Moreover, operations attempting to reset the computer system are also forbidden to be performed. For example, the combination keys "ALT-CTRL-DELETE" will be locked to forbid rebooting of the computer system. When the lock setting/function has been enabled, the computer system is defined as being operated in a lock state.

Figure 3:
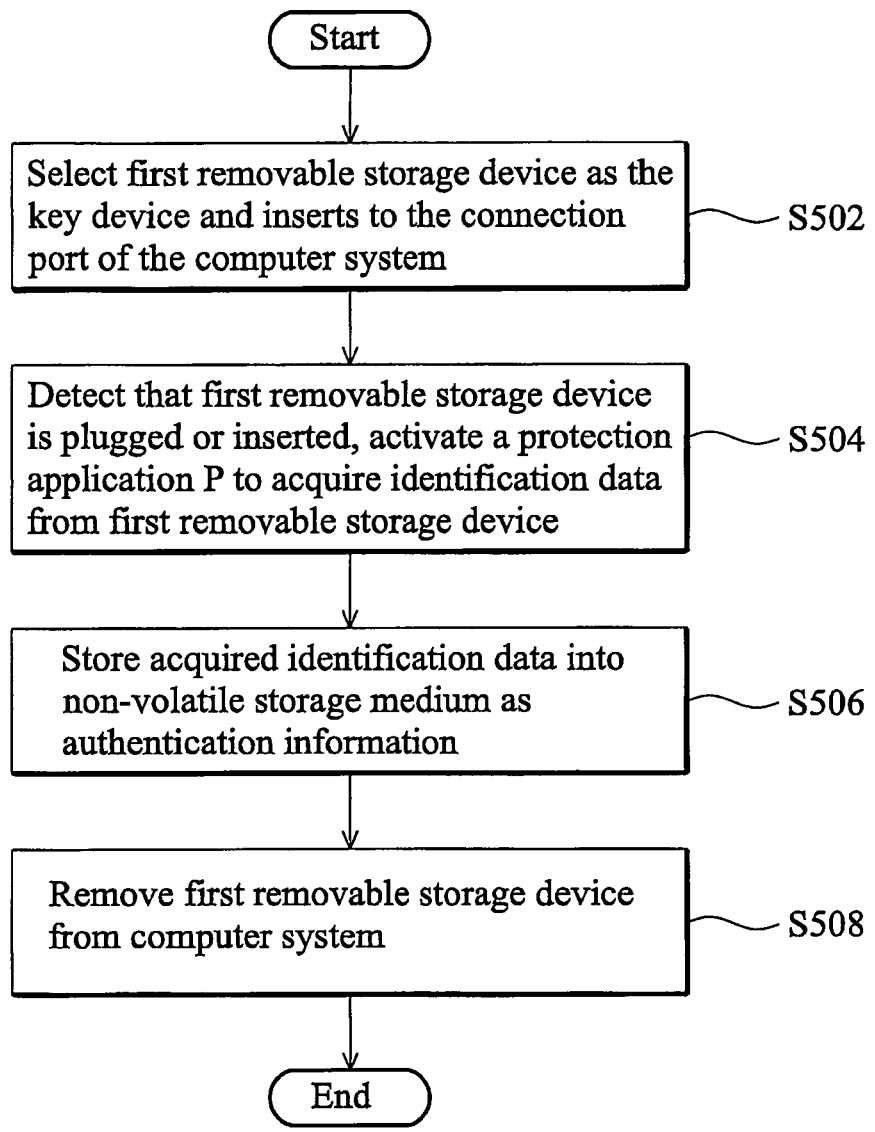
FIG. 3 is a flowchart of another method for data protection applied in a computer system.

FIG. 3 is a flowchart of another method for data protection applied in a computer system, and the method can be stored in a computer program and executed by the processor as described in FIG. 1. Referring to FIGS. 1 and 3, a first removable storage device is selected as the key device and is plugged or inserted into the connection port 140 of the computer system 100 (step S502). When detecting that the first removable storage device is plugged into or inserted into the connection port 140 of the computer system 100, a protection application P is activated to acquire identification data from the first removable storage device (S504). Note that the protection application P may be automatically activated or may be activated manually by the user when the key device (i.e. first removable storage device) is plugged into the computer system 100. As stated previously, the identification data may comprise, for example, a product identification number, a vendor identification number or a serial number of the first removable storage device. The acquired identification data is then stored into the non-volatile storage medium 130 as authentication information (step S506). This authentication information is then used to determine whether a later plugged in or inserted in removable storage device is an authorized user/removable storage device or not. Thereafter, the first removable storage device is removed from the computer system (step S508). In this case, the computer system is running in a protection mode and protected by the protection application P. In the protection mode, only the protection application P is forbidden to be removed and thus the user can use the keyboard or mouse or any operable functions for the computer system. Since the protection application P is running, data access of the computer system from any unauthorized removable storage device is detected and forbidden. Note that, in this embodiment, the protection application P may be forbidden to be removed by locking specific keys being pressed, such as the combination keys "ALT-CTRL-DELETE", hiding the protection application P or duplicating a plurality of the protection applications P in the task manager application in a Windows OS environment.

Figure 4:
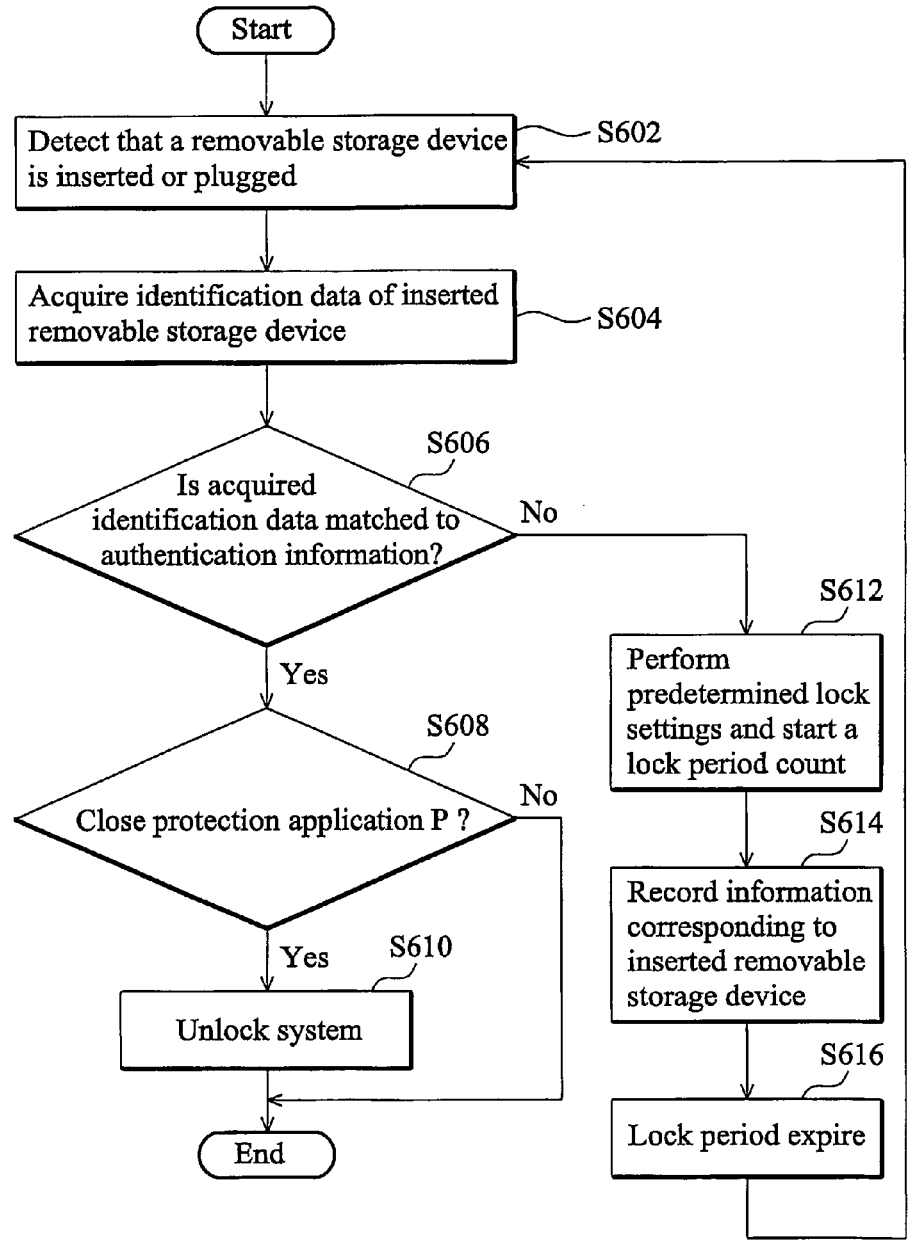
FIG. 4 is a flowchart of another method for data protection applied in a computer system.

FIG. 4 is a flowchart of another method for data protection applied in a computer system, and the method can be stored in a computer program and executed by the processor as described in FIG. 1. It is assumed that the protection application P is running so that ports of the computer system are monitored by the protection application P. First, it is detected that a removable storage device has been inserted or plugged into the port of the computer system (step 602). When detecting that the removable storage device has been inserted or plugged into the port of the computer system, the identification data of the inserted removable storage device (e.g. the product identification number, vendor identification number and serial number) is acquired (step S604) and it is then determined whether the acquired identification data matches with the authentication information (step S606). If the acquired identification data matches with the authentication information, the inserted removable storage device is recognized as being authorized and it is then determined whether to close the protection application P (S608). If so, the system is released from the protection mode and all previously locked functions are unlocked (step S610). The authorized removable storage device is allowed to fully access the computer system such as access data. If not (No in step S608), the process ends.

If, in step S606, the acquired identification data is different from the authentication information (No in step S606), the inserted removable storage device is recognized as being unauthorized and steps S612-S616 are processed. In step S612, predetermined lock settings are performed and a lock period count is started. For example, the keyboard and the mouse may be locked based on the lock setting. The information corresponding to the inserted removable storage device may be recorded so as to aid trouble shooting (step S614). The information corresponding to the inserted removable storage device may comprise information indicating when the unauthorized removable storage device attempted to plug into or be inserted into the port of the computer system, the type or the identification data of the unauthorized removable storage device, for example. With the computer system locked, unauthorized data access is forbidden. Therefore, the data in the computer system is protected.

If the lock period has expired, the locked setting/function can be released or unlocked (step S616) and the process can revert back to step S602 for detecting another insertion of removable storage device if any. In this case, the keyboard and mouse will be unlocked so that users may use the computer system. It is to be noted that, the protection application P is still executed so that the computer system is running in the protection mode. However, some locked functions such as locking of the combination keys "ALT-CTRL-DELETE" will still be locked. Once another insertion of removable storage device is detected and recognized as an unauthorized removable storage device, the keyboard and mouse would once again locked.

With the lock setting/function enabled, the computer system will be locked when the key device has been removed or unplugged. Once the computer system is locked, the user has to insert the key device that contains the right authentication information to unlock the computer system or wait for the lock period to expire. Without the correct key device, no one is able to access the system, i.e. data access in the computer system is forbidden.

The protection application P is further placed into the system registry file which is executed during system booting. The protection application P may also record the state of the computer system (e.g. normal, protection or lock state). Once the system is rebooted, the system registry file is executed.

When executing the system registry file, the protection application P will be executed. The protection application P will check the recorded state of the computer system to determine whether to lock the computer. When a lock state is recorded, predetermined lock settings (e.g. setting for locking the keyboard and mouse) will be performed and the computer system would run in the lock state, avoiding unauthorized users to attempt to shut down and reboot the system intentionally to release the lock state.

Figure 5:
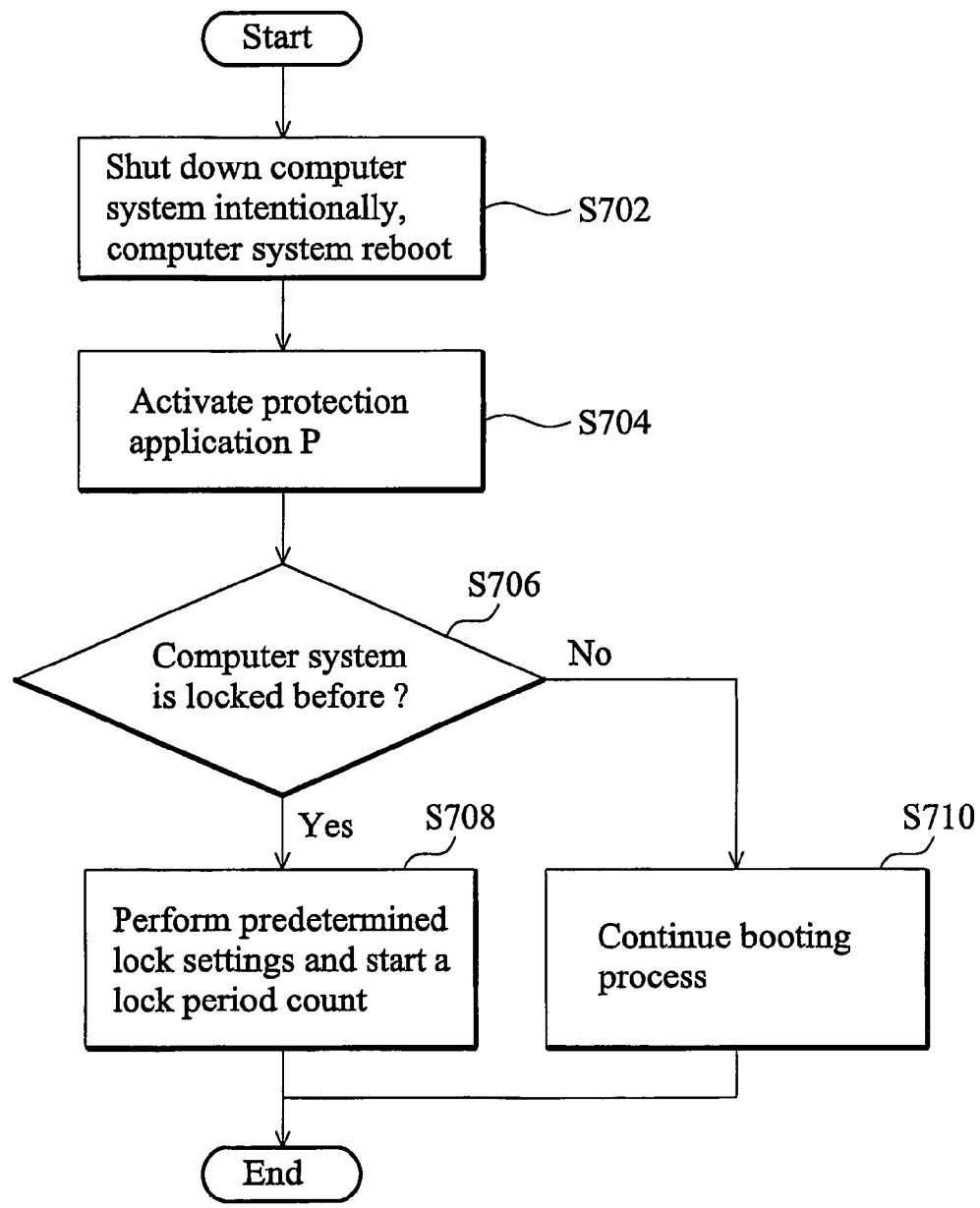
FIG. 5 is a flowchart of another method for data protection applied in a computer system.

FIG. 5 is a flowchart of another method for data protection applied in a computer system, and the method can be stored in a computer program and executed by the processor as described in FIG. 1. It is assumed that, in this embodiment, the computer system is currently running in a lock state and the state information is recorded in the non-volatile storage medium 130 by the protection application P. In step S702, the computer system is intentionally shut down thereby causing the computer system to reboot. In step S704, the protection application P is activated. In step S706, the state recorded is inspected by the protection application P to find out whether the computer system has been locked before. If a lock state is found, the computer system is determined to be locked. Thus, in step S708, predetermined lock settings (e.g. setting for locking the keyboard and mouse) are performed and a lock period count is started. For example, the keyboard and the mouse may be locked based on the lock setting. Otherwise (No in step S706), the booting process is continued (step S710) and the process ends.

It is to be noted that although only one removable storage device is plugged or inserted at the same time in the above-mentioned embodiments, the invention may also be applied to more than one removable storage devices being plugged or inserted into the system. In this case, identification data of each of the removable storage devices may be obtained and recognized first to determine whether any suitable removable storage device is plugged. If more than one suitable removable storage devices are found, the user may choose one as the key device and acquire the identification data of the chosen one to be the authentication information. The method for data protection in a computer system of the invention is then performed to protect the data access of the computer system.

An advantage of the embodiment is that the computer system can be operated even if the key device has been removed. Another advantage of the embodiment is that, because identification data of the key device is known and pre-stored, any data access from a non key removable storage device can be forbidden, preventing data in a computer system from being accessed by an unauthorized user.

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. A computer system, comprising:
   an interface logic; and
   a processor coupled to the interface logic, acquiring an authentication information from a first removable storage device when detecting that the first removable storage device has been inserted and entering a lock state and forbidding data access of the computer system when detecting that a second removable storage device has been inserted and identification data of the second removable storage device is different from the authentication information after the first removable storage device has been removed,
   wherein entering the lock state further comprises forbidding operations attempting to shut down/reset the computer system, and wherein the processor enters the lock state without the computer system rebooting.

2. The computer system as claimed in claim 1, further comprising a non-volatile storage medium storing a specific application, wherein the processor further performs the specific application to acquire the authentication information or the identification data and stores the authentication information or the identification data into the non-volatile storage medium.

3. The computer system as claimed in claim 2, wherein the processor further activates the specific application when detecting that the first removable storage device has been inserted, acquires identification data from the first removable storage device to obtain the authentication information.

4. The computer system as claimed in claim 3, further comprising an input unit, wherein the input unit is operable after the first removable storage device has been removed.

5. The computer system as claimed in claim 2, wherein the processor further forbids removing the specific application when the identification data of the second removable storage device is different from the authentication information, and performs at least one predetermined setting/operation to lock the computer system.

6. The computer system as claimed in claim 1, wherein the identification data comprises a vender identification number, a product identification number or a serial number of the first or second removable storage device or combinations thereof.

7. A method for data protection in a computer system, comprising:
   acquiring an authentication information from a first removable storage device when detecting that the first removable storage device has been inserted; and
   entering a lock state and forbidding data access of the computer system when detecting that a second removable storage device has been inserted and identification data of the second removable storage device is different from the authentication information after the first removable storage device has been removed,
   wherein entering the lock state further comprises forbidding operations attempting to shut down/reset the computer system, wherein the computer system enters the lock state without the computer system rebooting.

8. The method as claimed in claim 7, further comprising:
   performing a specific application to acquire the authentication information or the identification data.

9. The method as claimed in claim 8, wherein the step of acquiring the authentication information from the first removable storage device further comprises:
 activating the specific application when detecting that the first removable storage device has been inserted; and
 acquiring identification data from the first removable storage device to obtain the authentication information.

10. The method as claimed in claim 8, further comprising:
 forbidding removal of the specific application when the identification data of the second removable storage device is different from the authentication information; and
 performing at least one predetermined setting/operation to lock the computer system.

11. The method as claimed in claim 10, wherein the specific application is forbidden to be removed by locking specific keys being pressed, hiding the specific application or duplicating a plurality of the specific applications.

12. The method as claimed in claim 10, further comprising::
 recording in the computer system information that indicates when the second removable storage device was inserted and information corresponding to the second removable storage device.

13. The method as claimed in claim 8, further comprising:
 allowing removal of the specific application or data access of the computer system when the identification data of the second removable storage device is the same as the authentication information.

14. The method as claimed in claim 7, wherein the identification data comprises a vender identification number, a product identification number or a serial number of the first or second removable storage device or combinations thereof.

15. A machine-readable storage medium storing a computer program, and the computer program performing a method for data protection comprising the steps of:
 acquiring an authentication information from a first removable storage device when detecting that the first removable storage device has been inserted;
 allowing data access of the computer system when detecting that a second removable storage device has been inserted and identification data of the second removable storage device is the same as the authentication information after the first removable storage device has been removed; and
 entering a lock state and forbidding data access of the computer system when the identification data of the second removable storage device is different from the authentication information after the first removable storage device has been removed,
 wherein entering the lock state further comprises forbidding operations attempting to shut down/reset the computer system, wherein the computer system enters the lock state without the computer system rebooting.

16. The machine-readable storage medium as claimed in claim 15, wherein the method further comprises:
 activating a specific application to acquire the authentication information or the identification data when detecting that the first removable storage device has been inserted; and
 acquiring identification data from the first removable storage device to obtain the authentication information.

17. The machine-readable storage medium as claimed in claim 15, wherein the method further comprises:
 forbidding removal of the specific application when the identification data of the second removable storage device is different from the authentication information; and
 performing at least one predetermined setting/operation to lock the computer system.

18. A method for data protection in a computer system, comprising:
 acquiring identification data of an inserted removable storage device after a key storage device has been removed; and
 entering a lock state and performing a predetermined lock setting to forbid access to the computer system when the identification data is not the same as an authentication information; wherein the authentication information is preloaded from the key storage device and wherein entering the lock state further comprises forbidding operations attempting to shut down/reset the computer system, wherein the computer system enters the lock state without the computer system rebooting.

19. The method as claimed in claim 18, further comprising recording information corresponding to the inserted removable storage device.

* * * * *